US011171473B2

(12) United States Patent
Kang

(10) Patent No.: US 11,171,473 B2
(45) Date of Patent: Nov. 9, 2021

(54) SUPPORT MODULE FOR TRANSMISSION LINE SLEEVE

(71) Applicant: BRAITKOREA Co., Ltd., Cheonan-si (KR)

(72) Inventor: Hyo Jin Kang, Cheonan-si (KR)

(73) Assignee: BRAITKOREA Co., Ltd., Cheonan-si (KR)

( * ) Notice: Subject to any disclaimer, the term of this patent is extended or adjusted under 35 U.S.C. 154(b) by 35 days.

(21) Appl. No.: 16/659,464

(22) Filed: Oct. 21, 2019

(65) Prior Publication Data

US 2020/0144805 A1 May 7, 2020

(30) Foreign Application Priority Data

Nov. 1, 2018 (KR) .................. 10-2018-0132795

(51) Int. Cl.
*H02G 11/00* (2006.01)
*F16L 3/16* (2006.01)

(52) U.S. Cl.
CPC ............. *H02G 11/00* (2013.01); *F16L 3/16* (2013.01)

(58) Field of Classification Search
CPC .... H02G 11/00; H02G 3/0475; H02G 11/006; H02G 3/0456; H02G 3/0462; H02G 3/0406; F16L 3/16; F16G 13/16; B25J 9/104; H01L 21/67706
USPC ........................................................ 248/70
See application file for complete search history.

(56) References Cited

U.S. PATENT DOCUMENTS

| | | | | |
|---|---|---|---|---|
| 6,215,068 B1* | 4/2001 | Meier | ................... | H02G 11/00 174/68.1 |
| 6,930,244 B1* | 8/2005 | Nebel | ................ | B60R 16/0207 174/486 |
| 7,240,477 B1* | 7/2007 | Dunfee | ................... | F16G 13/16 248/49 |
| 2008/0121425 A1* | 5/2008 | Harada | ................... | F16G 13/16 174/70 R |
| 2011/0121141 A1* | 5/2011 | Tatsuta | ................ | H02G 11/006 248/49 |
| 2011/0240805 A1* | 10/2011 | Komiya | ............... | G02B 6/4461 248/68.1 |
| 2012/0187271 A1* | 7/2012 | Komiya | ............... | H02G 3/0487 248/634 |
| 2013/0075129 A1* | 3/2013 | Kaihotsu | ................ | F16G 13/16 174/68.3 |

(Continued)

FOREIGN PATENT DOCUMENTS

| | | |
|---|---|---|
| JP | H10-500747 A | 1/1998 |
| JP | 2013-042600 A | 2/2013 |

(Continued)

*Primary Examiner* — Muhammad Ijaz
(74) *Attorney, Agent, or Firm* — Studebaker & Brackett PC

(57) ABSTRACT

Provided is a support module for a transmission line sleeve. The support module for the transmission line sleeve includes a plate formed of a flexible material that extends in a longitudinal direction so as to be bent and spread, and a support block coupled along a longitudinal direction of the plate and disposed in plurality adjacently to each other. The support block includes a plurality of lower bodies coupled to the plate at a certain interval, and an upper body coupled to an upper surface of each of the lower bodies so as to form a load supporting portion in which a portion of the upper surface of the lower body is exposed.

12 Claims, 4 Drawing Sheets

(56) References Cited

U.S. PATENT DOCUMENTS

| | | | | |
|---|---|---|---|---|
| 2013/0264436 A1* | 10/2013 | Changeux | .......... | F16M 11/2014 |
| | | | | 248/70 |
| 2015/0179309 A1* | 6/2015 | Shin | .......... | H02G 11/00 |
| | | | | 174/135 |
| 2018/0195581 A1* | 7/2018 | Tetsuka | .......... | F16G 13/06 |
| 2020/0144805 A1* | 5/2020 | Kang | .......... | H02G 11/00 |

FOREIGN PATENT DOCUMENTS

| | | |
|---|---|---|
| JP | 2018-157713 A | 10/2018 |
| KR | 10-1100676 B1 | 1/2012 |
| KR | 10-1300068 B1 | 8/2013 |

\* cited by examiner

SUPPORT MODULE FOR TRANSMISSION LINE SLEEVE

CROSS-REFERENCE TO RELATED APPLICATIONS

This application claims the priority of Korean Patent Application No. 2018-0132795, filed on Nov. 1, 2018, the entire contents of which are hereby incorporated by reference.

BACKGROUND OF THE INVENTION

The present invention disclosed herein relates to a support module for a transmission line sleeve, and more particularly, to a support module for a transmission line sleeve, which has an improved structure by supporting the load of a transmission line sleeve and various cables inserted therein and thus preventing sagging.

In general, transmission lines such as air hoses and cables for energy supply or signal transmission are being used for various industrial machines such as robots and automation equipment which are used in the production line of advanced equipment such as semiconductors, LCD, and LED and the pharmaceutical process that produces various chemicals, and other automation equipment processes. A transmission line veyor is being used to safely protect and move these transmission lines. Here, transmission line veyor is referred to as a cableveyor.

The related-art transmission line veyor includes a plurality of unit blocks arranged in a line and a connection part for connecting the plurality of unit blocks, and the connection part connects the plurality of unit blocks such that the transmission line veyor can be bent.

In such a related-art transmission line veyor, friction between neighboring unit blocks and friction between unit blocks and transmission line occur during repeated bending and spreading, and noise and dust are generated by this friction and static electricity is also generated. The noise acts as a cause of hindering the working environment, and the dust not only hinders the work environment but also causes a defect of the product being produced. Also, the static electricity also causes a defect of the product being produced.

Accordingly, there is a demand for a technique for improving the limitations caused by generation of noise, dust, and static electricity.

According to this demand, a flexible sleeve has been proposed. The related-art sleeve includes one end fixed to a fixed part of the industrial machine and the opposite end fixed to a moving part of the industrial machine to perform a reciprocating motion together with the moving part, and includes an upper member and a lower member which have flexibility. A part of the upper member and a part of the lower member are attached to each other, and a transmission line is inserted into a receiving space between a part of the upper member and a part of the lower member which are not attached to each other.

The above-described sleeve can obtain an effect of reducing the generation of dust and noise during the repeated bending and spreading and thus overcoming some of the above-mentioned limitations.

However, when the length of the sleeve and the length of the transmission line inserted into the sleeve increase and thus the weight increases, sagging of the sleeve may occur. In order to prevent such sagging, a support module is inserted into the receiving space formed at the outermost of the receiving space of the sleeve.

Korean Patent No. 10-1300068 discloses a support module for preventing such sagging of a sleeve.

The related-art technology includes a plurality of first blocks rotatably connected to each other to form a first row, a plurality of second blocks rotatably connected to each other to form a second row parallel to the first row, and a plurality of bridges connecting the first row and the second row.

In the above-described related-art technology, the bridges interconnect the first block and the second block which are spaced left and right such that the first block and the second block are prevented from sagging downwardly. However, since the bridge is disposed across the sleeve, an interference with the transmission lines inserted into the sleeve occurs. Also, when a gap of the support module is distant, the length of the corresponding bridge needs to be long. Due to this bridge, the total weight of the bridge increases, resulting in sagging.

In addition, in the above-mentioned related-art technology, the rotation angle of the corresponding support module is limited through a protrusion and a protrusion receiving groove for receiving the protrusion. Accordingly, the curvature of folding according to the shape of the protrusion and the angle of contact between the protrusion and the protrusion receiving groove are all limited in both directions.

A general support module is installed in an industrial machine which reciprocates vertically or horizontally or back and forth, and is folded or unfolded in one direction. Accordingly, the curvature capable of folding in a direction to be folded needs to be unlimited within a range that does not deviate from the elastic restoring force of a plate for smooth operation of the support module.

However, the related-art technology has a limitation in that smooth operation of the support module cannot be realized by restricting the folding in both directions as described above. In the process of mutually combining the adjacent first blocks or the second blocks, a processing of inserting the protrusion into the protrusion receiving groove is essentially needed, and thus the manufacturing time increases and defects occur during the manufacturing process.

Furthermore, when the rotation angle is limited in a state where the protrusion is inserted into the protrusion receiving groove, since the protrusion is formed into a wedge shape having a narrowed end, slip and separation of the protrusion from the protrusion receiving groove occurs. Also, since processes for forming the protrusion and the protrusion insertion groove on the first block and the second block are additionally required or a mold corresponding to the left and right width and the front and rear end lengths of the support module is separately prepared, the manufacturing cost is increased.

PRIOR ART DOCUMENT

[Patent Document]
(Patent Document 1) Korean Patent No. 10-1300068

SUMMARY OF THE INVENTION

The present invention provides a support module for a transmission line sleeve, which can prevent sagging due to the weight of a transmission line inserted into a sleeve and a support module by improving the structure of the support module, and can prevent breakage of a support module by limiting a bending angle.

Embodiments of the present invention provide support modules for a transmission line sleeve including: a plate (10) formed of a flexible material that extends in a longitudinal direction so as to be bent and spread; and a support block (20) coupled along a longitudinal direction of the plate (10) and disposed in plurality adjacently to each other, wherein the support block (20) comprises: a plurality of lower bodies (21) coupled to the plate (10) at a certain interval; and an upper body (22) coupled to an upper surface of each of the lower bodies (21) so as to form a load supporting portion (30) in which a portion of the upper surface of the lower body (21) is exposed.

In some embodiments, the upper body (22) may have a hexahedral shape extending in a longitudinal direction, and one end thereof may make contact with the load supporting portion (30) of an adjacent lower body (21) to be limited in movement.

In other embodiments, the lower body (21) may be provided with a coupling protrusion (212) upwardly protruding, and the upper body (22) may be provided with a coupling hole (221) for receiving the coupling protrusion (212).

In still other embodiments, the lower body (21) may be provided with an insertion hole (211) through which the plate (10) is inserted.

In even other embodiments, the upper body (22) may be provided with a ridge (222) upwardly protruding from an upper surface thereof to reduce an area making contact with an inner circumferential surface of the sleeve.

In yet other embodiments, the ridge (222) may be disposed in pair at mutually spaced positions.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Figure 1:
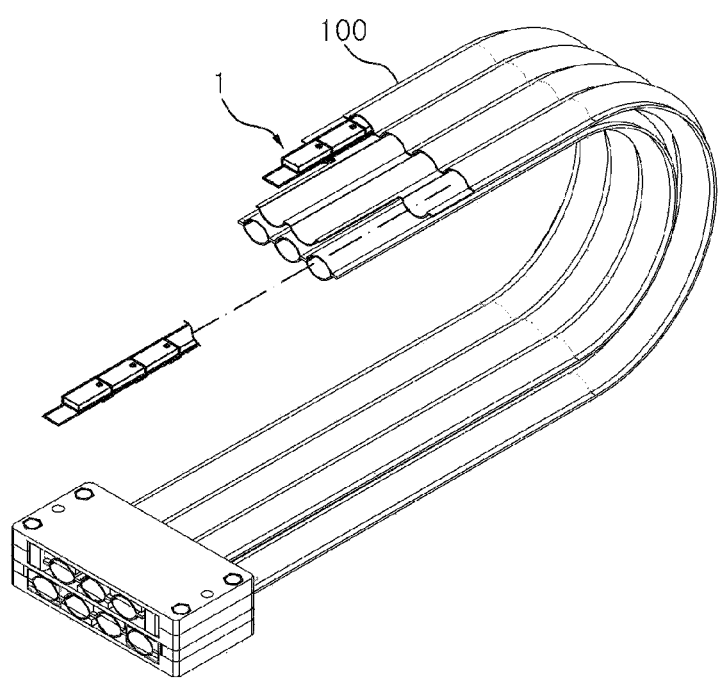
FIG. 1 is a view illustrating a support module for a transmission line sleeve according to an embodiment of the present invention.

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

Hereinafter, other objects and features of the present invention will be apparent from the following description of embodiments with reference to the accompanying drawings.

Unless defined otherwise, all terms used herein, including technical or scientific terms, have the same meaning as commonly understood by a person of ordinary skill in the art to which the present invention belongs. Terms such as those defined in commonly used dictionaries should be interpreted as having a meaning consistent with the meaning in the context of the related-art, and should not be interpreted as ideal or overly formal meaning unless explicitly defined in the present application.

Hereinafter, preferred examples of a support module for a transmission line sleeve according to an embodiment of the present invention will be described with reference to the accompanying drawings.

First, the support module 1 for a transmission line sleeve according to an embodiment of the present invention includes a plate 10 and a support block 20.

The plate 10 extends in a longitudinal direction and is formed of a material formed in a form of a thin sheet and having flexibility so as to be bent and spread.

In order to ensure durability during the repeated bending and spreading, the plate 10 is formed of a metallic material, and is formed in a form of a thin plate to increase the durability and reduce the weight, enabling bending and spreading.

Various materials may be used for the metallic material, but a corrosion-resistant material may be used to prevent corrosion due to moisture or the like, or a corrosion-resistant material such as aluminum may be used.

The width of the plate 10 and the length from the front end to the rear end of the plate 10 may be changed according to the width and length of the transmission line sleeve 100. There is no particular limitation on the width and the length of the plate.

Meanwhile, the plate 10 may be formed using a synthetic resin, and may be configured in a form of a joint in which a plurality of plate members are rotatably connected.

The support block 20 are adjacently coupled to each other along the longitudinal direction of the plate 10, and includes a lower body 21 and an upper body 22.

The lower body (21) is coupled to the plate 10 at a certain interval. Here, the method of coupling may be variously implemented.

For example, the plate 10 may be first formed and then placed in a mold frame for molding the lower body 21, and then a molten material may be put into a mold frame and then cooled to mold the lower body 21 to the plate 10 as one body.

As another example, holes may be formed in the plate 10 at a certain interval and then protrusions fitting into the holes may be provided on the lower body 21 to couple the lower body 21 to the plate 10.

As another example, the lower body 21 is formed into a hexahedral shape, and an insertion hole 211 through which the plate 10 is inserted is formed therein. Thus, the plate 10 and the lower body 21 are integrally combined.

Here, the lower body 21 is used to fix the upper body 22 to the plate 10. There is no limitation in material, but a relatively inexpensive material as compared with the upper body 22 may be formed for the lower body 21.

That is, in a related-art support module, in order to prevent the generation of dust and static electricity due to friction with the sleeve in a state where the support block is inserted into the receiving space formed in the sleeve, a material of high price such as ceramic or the like needs to be used, thereby causing an increase of the manufacturing cost of the support module.

Accordingly, in the support module of the present invention, the upper body 22 and the lower body 21 are separately formed, and the upper body 22 contacting the inner surface of the sleeve is formed of an expensive material such as ceramic capable of obtaining effects such as abrasion resistance, heat resistance and static electricity prevention, and the lower body 21 is formed of a relatively inexpensive synthetic resin material, thereby lowering the manufacturing cost.

Meanwhile, the lower body 21 may be a hexahedron having a rectangular cross-sectional shape as shown in the drawing, trihedron (cylinder), or a hexahedron having a cross-sectional shape of a star, a triangle or an ellipse.

The upper body 22, which is a part contacting the inner circumferential surface of the sleeve when inserted into the receiving space of the sleeve, is formed of a material that does not generate dust, generate static electricity and minimize heat generation due to friction.

The upper body 22 is coupled to the lower body 21 in a one-to-one manner. The coupling between the upper body 22 and the lower body 21 may be implemented in various methods.

In the present invention, a coupling protrusion 212 upwardly protruding from the upper surface of the lower body 21 is provided, and a coupling hole 221 through which the coupling protrusion 212 is inserted is formed in the upper body 22. In the drawing of one embodiment, the coupling protrusion 212 is fitted into the coupling hole 221.

Here, when the upper end of the coupling protrusion 212 is exposed on the upper surface of the upper body 22 and makes contact with the inner circumferential surface of the sleeve, dust, heating, static electricity may occur by friction. In order to overcome this limitation, the coupling hole 221 may be formed to have a hole shape which is opened toward the lower body 21 and is closed toward the upper end thereof. As another example, an abrasion resistant tab (not shown) formed of the same material as the upper body 22 may be further disposed on the upper end portion of the coupling protrusion 212.

Meanwhile, when the upper body 22 is coupled to the lower body 21, an upper portion of the lower body 21 is exposed to the outside to form a load supporting portion 30 on the lower body 21.

Figure 3:
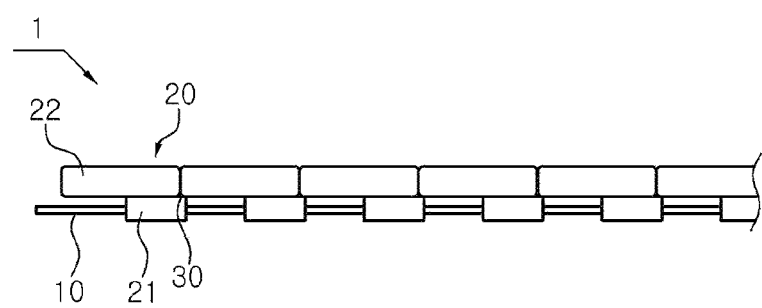
FIG. 3 is a side view illustrating a combination state of a support module for a transmission line sleeve according to an embodiment of the present invention.
Figure 4:
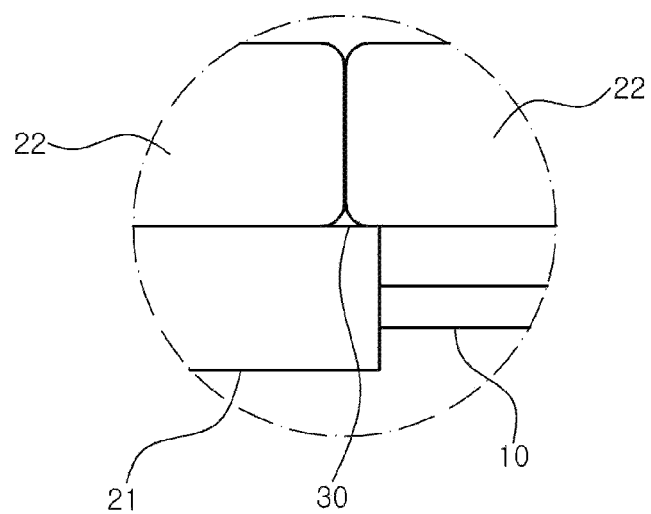
FIG. 4 is an enlarged view illustrating a load supporting portion according to an embodiment of the present invention.
Figure 5:
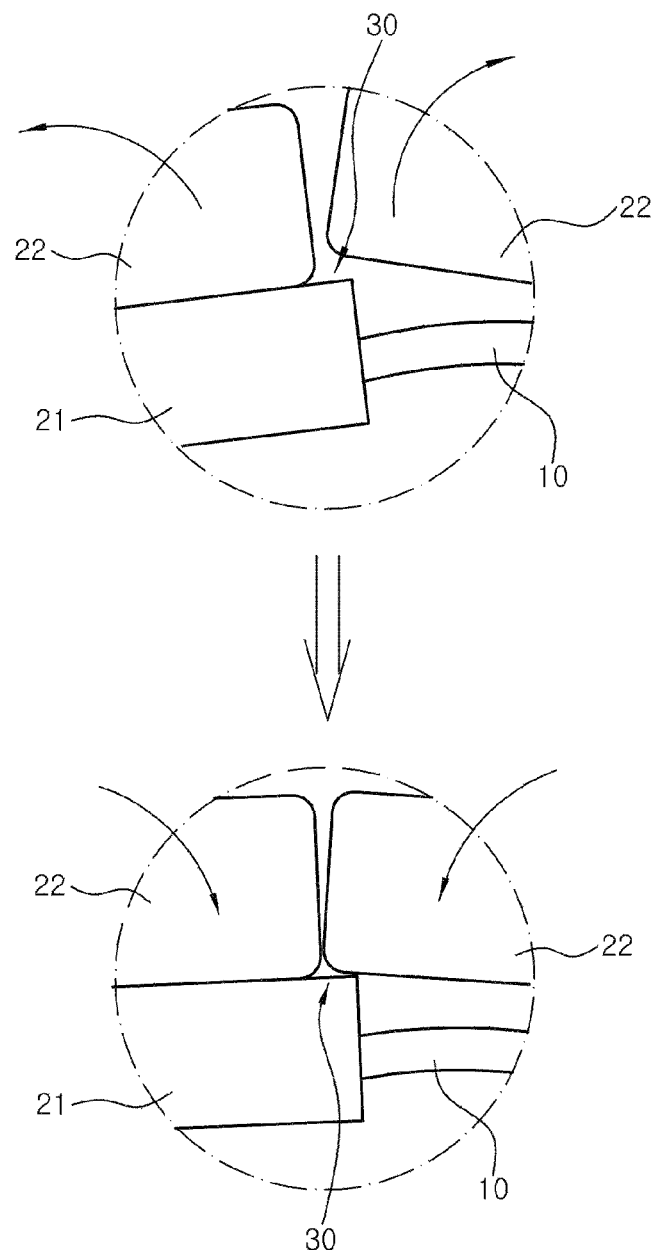
FIG. 5 is a view illustrating an operation state of a support module according to an embodiment of the present invention.

That is, as shown in FIGS. 3 and 4, one end portion of the upper body 22 is disposed on a vertical line spaced apart from one end portion of the lower body 21.

Thus, the other end portion of another adjacent upper body 22 may make contact with and be supported by the upper surface of the exposed lower body 21 to prevent the whole support module from downwardly sagging.

The support module needs to support the weight of various cables inserted into the sleeve in addition to the weight of the support module itself to keep the transmission line sleeve horizontal. In this case, the support module according to an embodiment of the present invention may make contact with the load supporting portion formed on an adjacent support block and thus dispersedly support the load through the load supporting portion 30, thereby preventing the whole support module from sagging.

Also, even when a force for downwardly moving the upper body occurs due to impact, vibration, and pressure applied from the upper side of the upper body 22, the load supporting portion 30 may support the end portion of the upper body 22, and thus prevent the upper body 22 from deviating from the lower body 21 of an adjacent support block 20 and making contact with the plate 10. Thus, the deformation of the support module can be prevented.

In other words, in spite of an elastic restoring force and vibration of the plate 10 generated when the support module is spread, the upper body 22 may make contact with the load supporting portion 30 formed on the adjacent support block 20 and may be limited in movement, thereby preventing deformation and breakage of the plate 10. Also, it is possible to obtain an effect that the alignment of the support module is quickly performed.

Here, the load supporting portion 30 may be formed to protrude in a length that does not interfere with the lower body 21 of the other adjacent support blocks in addition to the case of being formed on the exposed portion of the lower body 21. In another embodiment, the load supporting portion 30 may protrude from the edge of the lower body 21, and may be formed in plurality at certain intervals.

The length of the load supporting portion 30 may be changed according to the curvature of the support module.

For example, when the curvature value K at which the support module is bent is 5, the length of the load supporting portion 30 is about 1 mm.

As another example, when the curvature value K at which the support module is bent is 10, the length of the load supporting portion 30 is about 1.5 mm.

Since the lower body 21 is a part for connecting the plate 10 and the upper body 22, and forms more elastic restoring force that bends and spreads the plate as the area of the lower body 21 making contact with the plate 10 is smaller. Here, the area necessary for fixing the upper body 22 needs to be ensured.

Accordingly, the overall size of the lower body 21 needs to satisfy both the elastic restoring force of the plate 10 and the fixation of the upper body 22, and the length of the load supporting portion 30 is selected by repeated experiments according to the curvature value at which the support module is bent.

However, in the case where the curvature value K at which the support module is bent is about 5 and the length of the load supporting portion 30 is equal to or smaller than about 1 mm, when the upper body 22 moves downward, that is, when the support module is spread, the end portion of the load supporting portion 30 deviates from the load supporting portion 30 and moves downward to damage the plate 10. Also in the case where the curvature value K at which the support module is bent is about 5 and the length of the load supporting portion 30 is equal to or larger than about 1 mm, since the length of the lower body itself needs to be extended in order to form the length of the load supporting portion 30 to be 1 mm or more while maintaining a space for the lower body 21 to couple to the upper body 22, the elastic restoring force of the plate is changed.

Accordingly, preferably, when the curvature value K at which the support module is bent is about 5, the length of the load supporting portion 30 is about 1 mm.

Meanwhile, a ridge 222 upwardly protruding from the upper surface of the upper body 22 is further formed to reduce the area making contact with the inner circumferential surface of the sleeve and thus reduce the generation of dust, static electricity and heat due to friction.

Figure 2:
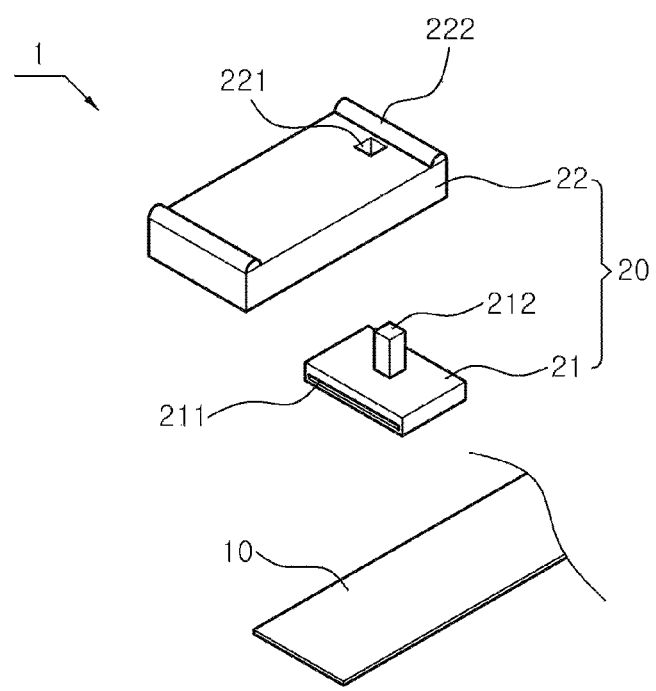
FIG. 2 is a view illustrating a state in which a support module for a transmission line sleeve according to an embodiment of the present invention is disassembled.

As shown in FIG. 2, the ridge 222 may protrude upward from the upper body 22, and the protruding end portion may be hemispherical.

The ridges 222 are symmetrically formed on the upper surface of the upper body 22 at the mutually spaced positions such that at least one of the ridges 222 continuously makes contact with the inner surface of the sleeve when the support module is bent.

Since the inner surface of the sleeve and the support module are kept in contact with each other through the ridge 222, the sleeve can be moved in linkage with the movement of the support module and the operation accuracy can be secured. In addition, dust generation, static electricity generation, and overheating can be solved by changing from the related-art surface contact type to the point contact type.

Here, the shape, number, and position of the ridge 222 are not limited to those shown in the drawings, and may be changed into various shapes, numbers, and positions according to the shape and size of the support module.

As described above, the present invention has been described with reference to specific elements, limited embodiments and drawings. However, it should be understood that the present invention is not limited to the above-described embodiments and various modifications and changes can be made by those skilled in the art to which the present invention pertains.

Therefore, the spirit of the present invention should not be construed as being limited to the above-described embodiments and all of the claims or equivalents of the claims described later belong to the scope of the present invention.

A support module for a transmission line sleeve according to an embodiment can prevent sagging due to the weight of a transmission line inserted into a sleeve and a support module by improving the structure of the support module, and can prevent breakage of a support module by limiting a bending angle. Also, the support module does not break or damage a plate in spite of vibration and impact generated during the operation, thereby extending the service life.

In addition, the area of contact with the inner circumferential surface of the sleeve is minimized, thereby overcoming the limitations of dust generation, static electricity generation, and overheating due to friction and thus improving the durability.

The above-disclosed subject matter is to be considered illustrative and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A support module for a transmission line sleeve, comprising:
   a plate formed of a flexible material that extends in a longitudinal direction so as to be bent and spread; and
   a support block disposed between adjacent support blocks, and coupled to the adjacent support blocks along the longitudinal direction of the plate,
   wherein the support block comprises:
   a lower body coupled to the plate at a certain interval from adjacent lower bodies of the adjacent support blocks; and
   an upper body coupled to an upper surface of the lower body, and
   wherein the upper surface of the lower body comprises:
   a first portion being in contact with a lower surface of the upper body; and
   a second portion configured to be in contact with an adjacent upper body of one of the adjacent support blocks to support the adjacent upper body of the one of the adjacent support blocks.

2. The support module for a transmission line sleeve according to claim 1, wherein the upper body has a hexahedral shape extending in the longitudinal direction, and
   one end thereof makes contact with a second portion of an adjacent lower body of the other one of the adjacent support blocks to be limited in movement.

3. The support module for a transmission line sleeve according to claim 1, wherein the lower body is provided with a coupling protrusion upwardly protruding, and
   the upper body is provided with a coupling hole for receiving the coupling protrusion.

4. The support module for a transmission line sleeve according to claim 3, wherein the lower body is provided with an insertion hole through which the plate is inserted.

5. The support module for a transmission line sleeve according to claim 3, wherein the coupling hole of the upper body is opened toward the lower body for receiving the coupling protrusion of the lower body and closed toward an upper end of the upper body for preventing the coupling protrusion from being in contact with an inner circumferential surface of the sleeve.

6. The support module for a transmission line sleeve according to claim 3, wherein an abrasion-resistant tab made of ceramic material is disposed on an upper end portion of the coupling protrusion.

7. The support module for a transmission line sleeve according to claim 1, wherein the upper body is provided with a ridge upwardly protruding from the upper surface thereof to reduce an area making contact with an inner circumferential surface of the sleeve.

8. The support module for a transmission line sleeve according to claim 7, wherein the ridge is disposed in pair at mutually spaced positions.

9. The support module for a transmission line sleeve according to claim 7, wherein the ridge has a hemispherical protruding end portion.

10. The support module for a transmission line sleeve according to claim 1, further comprising:
    a plurality of supporting blocks.

11. The support module for a transmission line sleeve according to claim 1, wherein, when the support module is configured to be bent with a curvature value 5, a length of a load supporting portion is 1 mm.

12. The support module for a transmission line sleeve according to claim 1, wherein, when the support module is configured to be bent with a curvature value 10, a length of a load supporting portion is 1.5 mm.

* * * * *